H. H. WIGGERS,
Assignor to himself & F. B KEARNEY.
Cradle
No. 8,563. Reissued Jan. 28, 1879.
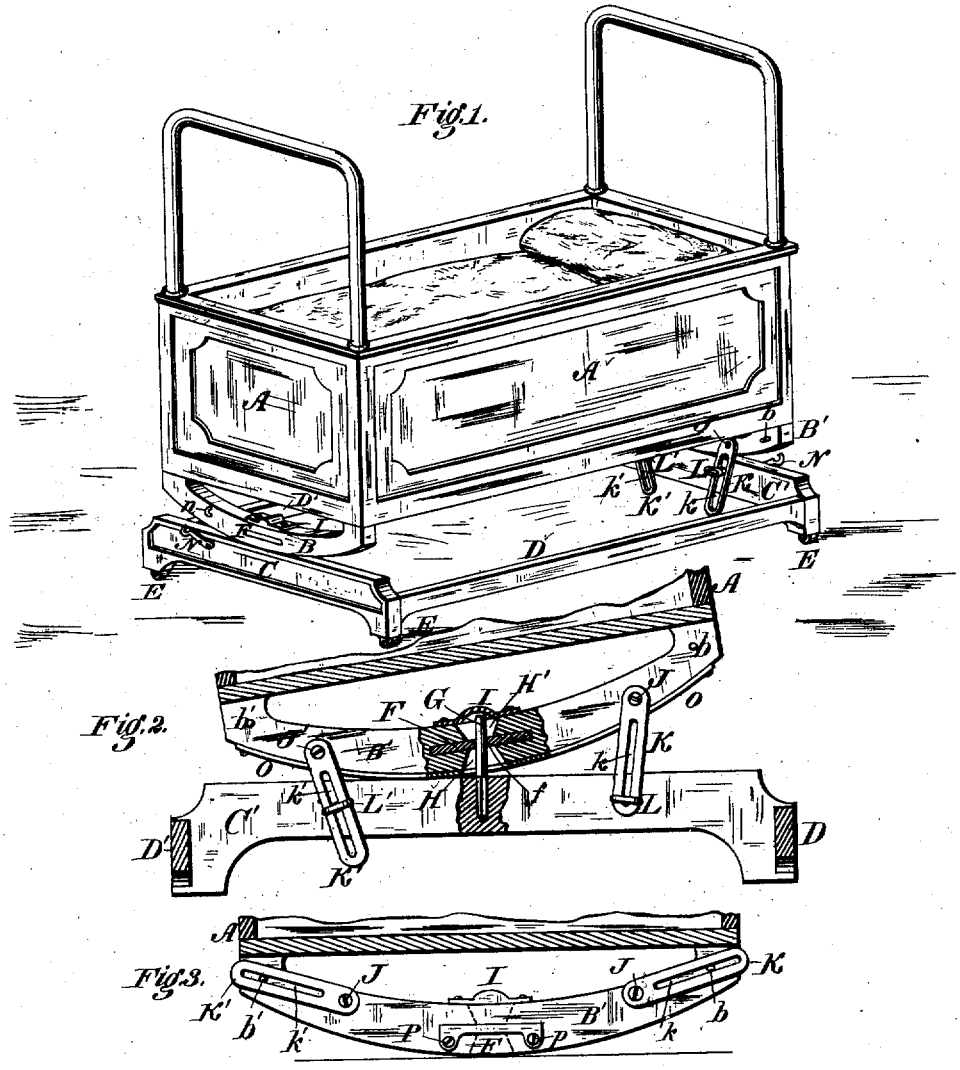
Witnesses:
Dorm P. Twitchell.
D. P. Cowl
Inventor:
H. H. Wiggers.
By Dodgerson
Attys.
N. PETERS, PHOTO-LITHOGRAPHER, WASHINGTON, D. C.

UNITED STATES PATENT OFFICE

HENRY H. WIGGERS, OF CINCINNATI, OHIO, ASSIGNOR TO HIMSELF AND FRANCIS B. KEARNEY, OF SAME PLACE.

IMPROVEMENT IN CRADLES.

Specification forming part of Letters Patent No. 130,554, dated August 13, 1872; Reissue No. 8,563, dated January 28, 1879; application filed October 5, 1878.

*To all whom it may concern:*

Be it known that I, HENRY H. WIGGERS, of Cincinnati, Hamilton county, Ohio, have invented certain Improvements in Cribs and Cradles, of which the following is a specification:

This invention relates to that class of cradles which are adapted to rock upon a supporting stand or base.

My invention consists in fitting the parts together by means of a slot or mortise in one member and a rigid guide or pintle secured to the other member, when said connecting devices are concealed or inclosed, in contradistinction to devices exposed on the outside.

The second part of my improvement consists in pivoting to each rocker shackles or links, through whose heads are passed thumb-screws, which engage with the stand. The screws, by being brought in contact with the lower ends of the slots, serve to limit the oscillation of the cradle, thereby preventing its rocking so far as to be thrown off on either side of the stand. The shackles may be readily detached from the thumb-screws, which hold them to the base. The flat ends of the screws are turned lengthwise the slots, and the shackles can then be turned up across the face of the rockers. The cradle is then adapted for use without the stand or base.

My invention also consists in minor combinations of parts, hereinafter explained in detail.

In the accompanying drawings, Figure 1 is a perspective view of a combined crib and cradle embodying my improvements. Fig. 2 is a partially-sectional elevation of one of the rockers and its supporting-stand on a somewhat enlarged scale. Fig. 3 is an elevation showing the body of the cradle detached from its stand, so as to be used upon the floor, A representing the body of the cradle, which may be of any desired material, shape, or style of finish.

The body has secured to it two rockers, B B′, which are adapted to oscillate upon two sills, C C′, whose upper surfaces are horizontal, as shown. These sills are united by stretchers D D′, and, together with the stretchers, constitute the stand, which may be mounted upon swivel-casters E.

In order to permit the rockers to oscillate upon the sills without becoming accidentally detached therefrom, I have shown the following devices: a plate, F, fitted horizontally within each rocker, and having at its mid-length an orifice or slot, *f*, which receives the guide G, the latter being firmly secured in the other member.

I have also shown mortises H H′ to receive the guide. I have also shown a guide or pintle, G, firmly secured to one of the members and projecting into mortises in the other member. I have also shown on the inner sides of the rockers two shackles or links, K K′, having longitudinal slots *k k′* for the reception of thumb-screws or ring-eyes L L′, which engage with the sills. I have also shown hooks or catches N attached to one member and engaging a suitable device on the other member, whereby the cradle and frame may be locked together, so as to prevent the former from rocking, if desired, thus transforming it into a stationary crib.

Operation: When it is desired to use this device as a cradle, the hooks or catches N are disengaged, thereby leaving the body free to rock upon the sills. The lower ends of the slots within the links K K′ being brought into contact alternately with the screws L L′ act as stops to limit the motion of the cradle and prevent it overturning. It is preferred that the heads of the screws L L′ should, as a general thing, be preserved in a position at right angles to the slots of the shackles; but whenever it is desired to disconnect the cradle from the stand these screws should be turned around, so that their heads will be presented longitudinally of said slots. When thus turned the shackles can be sprung over the heads of the screws and then engaged over pins *b b* on the rockers, after which the body can be lifted from its supporting-stand.

This article of furniture is cheap and simple in its construction, noiseless in its operation, and remarkably durable, besides which it combines the advantages both of crib and cradle. The mortises H H′ may, if desired, be straight instead of flaring, as shown in the drawings.

I am aware that a rocking cradle has been provided with hooks to lock it fast upon the base or stand; also, that a cradle has been provided with an outside wooden tenon fitting into an open outside mortise in the wooden base-frame, and these features, broadly considered, I do not claim.

I claim as my invention—

1. In combination with the rockers, the supporting-stand, and a guide to prevent lateral movement, the slotted shackles and rotatable stops L L′, constructed and applied as herein described, so as to allow the shackles to be cast off or disconnected at will.

2. A cradle consisting of a supporting member, a rocking member, central guides secured rigidly to one member and extending into mortises in the other member, and two stops, other than and independent of the sides of the mortises, located on opposite sides of the guide to limit the motion of the rocking member and prevent it from being overturned, substantially as shown and described.

3. The cradle consisting of the rocking member, the supporting-stand, the guide secured rigidly to one member and entering a concealed mortise in the other, the hooks to lock the two members together, and the stops to limit the oscillation of the rocking member, substantially as and for the purpose described.

4. In a rocking cradle, a supporting member, a rocking member, and a central metal guide-pin and guide-plate, the two secured rigidly in the respective members, with their points of bearing concealed and protected therein.

In testimony of which invention I hereunto set my hand this 3d day of October, 1878.

HENRY H. WIGGERS.

Witnesses:
DONN I. TWITCHELL,
D. P. COWL.